July 23, 1940.                J. F. O'BRIEN                2,208,682
                CONTROLLING MECHANISM FOR SPRINKLER SYSTEMS
                Filed Dec. 24, 1937            2 Sheets-Sheet 1
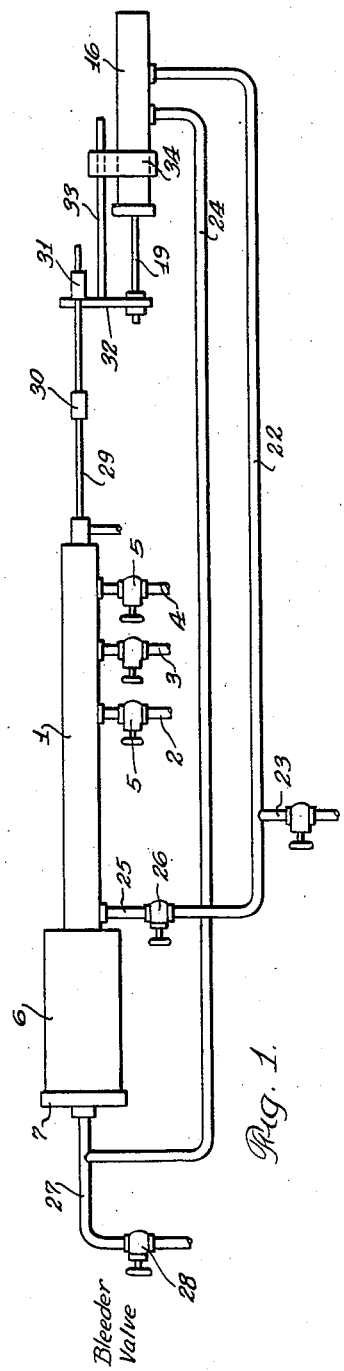
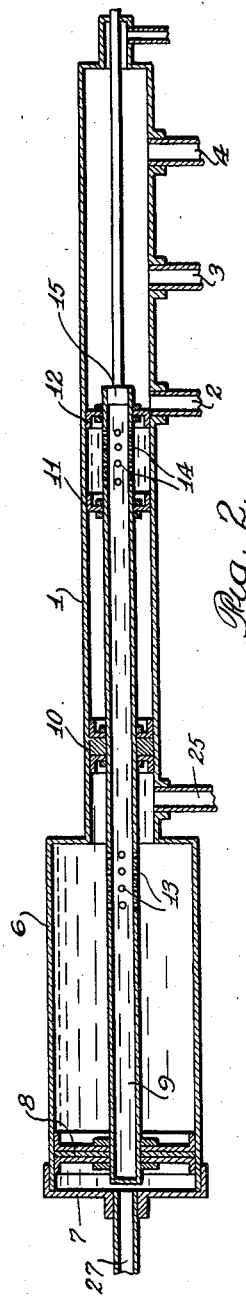
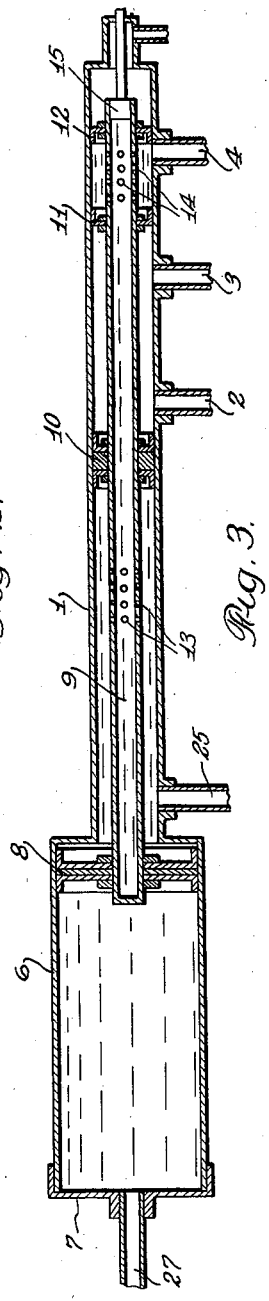

July 23, 1940.   J. F. O'BRIEN   2,208,682
CONTROLLING MECHANISM FOR SPRINKLER SYSTEMS
Filed Dec. 24, 1937   2 Sheets—Sheet 2
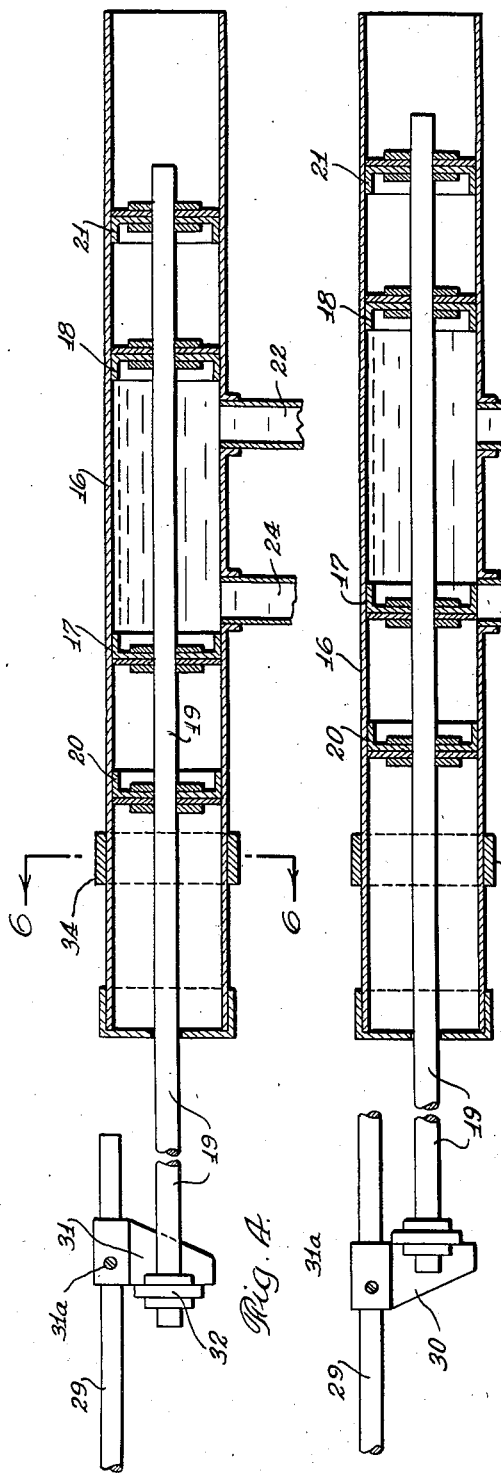
Inventor
John F. O'Brien Patented July 23, 1940

2,208,682

UNITED STATES PATENT OFFICE 2,208,682

CONTROLLING MECHANISM FOR SPRINKLER SYSTEMS

John F. O'Brien, Detroit, Mich.

Application December 24, 1937, Serial No. 181,649

3 Claims. (Cl. 121—164)

The present invention relates to apparatus for controlling the flow of water with respect to lawn sprinklers and has for its primary object to provide apparatus of this character which functions automatically to supply water to a plurality of sprinkler conduits respectively and for predetermined periods of time.

Lawn sprinkler systems of the character here referred to usually embody underground water pipes and vertical risers extending therefrom to the sprinklers disposed at the ground surface. Due to the fact that the public water systems operate under pressure too small to operate a large number of sprinklers at one time it becomes necessary to arrange the sprinklers in groups, with each group having an individual supply line, and to operate the groups individually. This invention relates to the control apparatus and functions to supply water to the supply lines for a plurality of groups of sprinklers in a manner whereby the groups operate individually and successively.

An important object of the present invention is to provide means operated by the pressure of water for distributing water to a plurality of sprinkler conduits, and a control for said means which automatically functions as a result of operation of said means for reversing its direction of movement. As the distributing means moves in one direction it distributes water successively to a plurality of sprinkler conduits and when the automatic control operates to reverse its direction of movement it distributes water to the same conduits during its reverse stroke. With this arrangement water is supplied to the sprinklers constantly and there is no cessation in the supply during the reverse stroke of the distributor as is the case in certain types of apparatus known to the art and available on the market.

Another object of the invention is to provide apparatus of this character embodying a manual control which may be set to regulate the speed of movement of the distributor, in order that the duration of operation of sprinkler groups may be varied.

With the above and other ends in view, the invention is more fully disclosed with reference to the accompanying drawings, in which Figure 1 is an elevation of the apparatus;

Figs. 2 and 3 are vertical sections of the distributor, illustrating different stages in operation;

Figs. 4 and 5 are vertical sections of the automatic control, illustrating different stages in operation, and Fig. 6 is a section taken on the line 6—6 of Fig. 4.

Like characters of reference are employed throughout to designate corresponding parts.

An elongate cylinder 1 has pipe lines 2, 3 and 4 opening thereinto at points spaced in the direction of the length of the cylinder. The pipe lines 2, 3 and 4 are provided with manual valves which may be opened or closed as desired for the purpose of regulation. Although it is not shown, it will be understood that the pipe lines 2, 3 and 4 are adapted to be connected by the underground piping, above referred to, to a plurality of groups of lawn sprinklers. Obviously, when three pipe lines are connected to the cylinder 1 there will be three groups of sprinklers, but this number has been chosen for an example only and may be varied to meet varying requirements as to the number of sprinklers used.

The cylinder 1 opens into the co-axial cylinder 6, which is considerably larger in diameter than the cylinder 1, and which has an end closure 7. Mounted in the cylinder 6 is a piston 8 having a hollow piston rod 9 extending therefrom and into the cylinder 1. On the rod 9, within the cylinder 1, is a piston head 10 comprising a seal for confining liquid in the cylinder 1. Also mounted on the rod 9, spaced from the sealing piston 10, are two spaced apart piston heads 11 and 12. The rod 9 has a series of apertures 13 disposed between the two pistons 8 and 10, a series of apertures 14 disposed between the two pistons 11 and 12, and a plug 15 in the end thereof. Thus, when water is supplied to the cylinder 6 it flows through the apertures 13, hollow piston rod 9 and apertures 14 to the space between the two pistons 11 and 12 so that lengthwise movement of the pistons 11 and 12 distributes the water so supplied to the pipe lines 2, 3 and 4.

A cylinder 16 has two pistons 17 and 18 therein secured in spaced relation on a rod 19. Sealing pistons 20 and 21 are also mounted on the rod 19 adjacent the pistons 17 and 18 respectively. A supply pipe line 22, adapted to be connected to a water main by a valve controlled conduit 23, opens into the cylinder 16 adjacent to another pipe line 24 which comprises an outlet. With the pistons 17 and 18 positioned as shown in Fig. 4 water may flow from the pipe line 22 to the pipe line 24, and with them positioned as shown in Fig. 5 such flow is prevented. The supply line 22 is connected by a branch pipe line 25, having a valve 26 therein, to the cylinder 1 on the side of the sealing piston 10 which is nearest the cylinder 6.

The pipe line 24 is connected to a pipe line 27 which opens through the end closure 7 of the cylinder 6. The pipe line has a bleeder valve 28 therein and is adapted to extend to a sewer drain or the like.

Connected to the piston rod 9 and extending outwardly through the end of the cylinder 1 is an elongate stem 29 having two spaced apart lugs 30 and 31 secured thereon. The lugs 30 and 31 are adapted to engage an arm 32 on the projecting end of the rod 19, the latter being movably supported by a shaft 33 which slides in a bearing 34 secured on the cylinder 16.

In describing the operation reference is had first to Figs. 2 and 5, and it is assumed that water is being supplied under pressure to the pipe line 22. From the pipe line 22 the water flows through the cylinder 16 and pipe lines 24 and 27 to the cylinder 6 and moves the piston 8 and rod 9 in a direction toward the right hand side of Fig. 2. The bleeder valve 28 is partly open so that part of the water supplied to the pipe line 27 is permitted to escape. The rate of escape determines the speed of movement of the piston 8.

Water is also supplied to the cylinders 1 and 6 on the right hand side of the piston 8 through the pipe line 25, and this water flows through the hollow piston rod 9 to the space between the two piston heads 11 and 12. As the rod 9 is moved the pistons 11 and 12 move across the orifices of the pipes 2, 3 and 4 and water from the space between the piston heads 11 and 12 is supplied to these pipes respectively. As the piston 8 completes its stroke, the lug 30 engages the arm 32 and shifts the rod 19 from the position shown in Fig. 4 to that shown in Fig. 5, and the piston head 17 prevents the flow of water through the pipe line 24. Water may bleed from the cylinder 6 through the bleeder valve 28 and the pressure of the water on the right hand side of the piston 8 shifts the rod 9 from the position shown in Fig. 3 back to that shown in Fig. 2. As it nears the latter position the lug 31 strikes the arm 32 and moves the rod 19 whereby the piston head 17 again uncovers the orifice of the pipe 24.

From the foregoing it becomes apparent that the water pressure as controlled by the valve mechanism in the cylinder 16 causes the piston 8 to reciprocate and in so doing supplies water to the pipe lines 2, 3 and 4 in succession. It will also be noted that the pipes 2, 3 and 4 are supplied with water during movement of the piston in both directions.

It will be noted, upon reference to Figs. 2 and 3, that the length of the element 9 is such that the piston heads 11 and 12 are moved entirely across the orifice of the pipe 2 (see Fig. 2) and that their travel in the other direction (see Fig. 3) does not carry them past the orifice of the pipe 4. With this arrangement the pipe 2 will receive more water than the pipe 4. It will be understood that this arrangement may be varied by changing the length of the element 9 so that the pipes 2 and 3 will receive equal amounts of water. Another mode of accomplishing the same result would be to permit lengthwise adjustment movement of the piston heads 11 and 12 relative to the element 9.

The lugs 30 and 31 are frictionally positioned on the rod 29 by set screws 31a and the position of the lugs may be varied to stop movement of the piston 8 at various points between the extreme positions illustrated. The device may be regulated by this means so that water is supplied to only two pipes, for example, pipes 2 and 3, or pipes 3 and 4.

Although a specific embodiment of the invention has been illustrated and described it will be understood that various changes may be made within the scope of the appended claims without departing from the spirit of the invention, and such changes are contemplated.

What I claim is:

1. A water pressure operated motor for reciprocating a piston of a water distributor comprising, a cylinder having spaced apart ports for passage of water to act against opposite sides of the piston, a push rod operable by the piston and reciprocal in and longitudinally of said cylinder, a pair of spaced apart plungers secured to said rod in said cylinder, said plungers providing a space therebetween to establish communication between said ports and one of said plungers closing one of said ports upon movement of said rod and plungers in one direction by the piston, and sealing members secured on said rod outwardly of said plungers.

2. In a lawn sprinkler system having a cylinder, a piston in said cylinder, a bleeder valve connected to the cylinder on one side of the piston, water discharge means communicating with the cylinder on the other side of the piston, of a control for the piston comprising a cylinder having a port communicating with the cylinder on said other side of the piston and communicating with a source of water supply, a second port in said second-named cylinder and communicating with said first-named cylinder between said bleeder valve and said one side of said piston, a push rod reciprocal longitudinally within said second-named cylinder and operable by the piston, a pair of plungers secured to said rod and spaced apart to establish communication between said ports, one of said plungers upon movement of said rod in one direction closing said second-named port, and sealing members secured to said rod within said second-named cylinder outwardly of said plungers.

3. In a lawn sprinkler system having a cylinder; a piston in said cylinder; a bleed for said cylinder on one side of said piston; water discharge means communicating with the cylinder on the other side of the piston; a control for the piston comprising, a container having a port for communication with the cylinder on said other side of the piston and also communicating with a source of supply of water, a second port in said container and communicating with the cylinder intermediate the bleed and said one side of said piston, and a pair of spaced reciprocal members in said container and operable by the piston, said members being operable to establish communication between said ports and one of said members also being operable upon movement by the piston of said members to one position to close said second-named port.

JOHN F. O'BRIEN.